(12) United States Patent
Schwarz et al.

(10) Patent No.: US 8,937,452 B2
(45) Date of Patent: Jan. 20, 2015

(54) METHOD OF CONTROLLING A STATE-OF-CHARGE (SOC) OF A VEHICLE BATTERY

(75) Inventors: Jonathan R. Schwarz, Clawson, MI (US); Gregory E. Smith, Toledo, OH (US); Ian L. Hanna, Clarkston, MI (US); Damon R. Frisch, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 954 days.

(21) Appl. No.: 13/021,204

(22) Filed: Feb. 4, 2011

(65) Prior Publication Data

US 2012/0200257 A1    Aug. 9, 2012

(51) Int. Cl.
    *H02J 7/14*     (2006.01)
    *H01M 10/42*    (2006.01)
    *H01M 10/48*    (2006.01)

(52) U.S. Cl.
    CPC ............ *H01M 10/42* (2013.01); *H01M 10/486* (2013.01); *H01M 2200/10* (2013.01); *H01M 2220/20* (2013.01)
    USPC ............................ 320/104; 320/134; 320/153

(58) Field of Classification Search
    USPC ........... 320/104, 109, 132, 134, 153; 324/431
    See application file for complete search history.

(56) References Cited

U.S. PATENT DOCUMENTS

| | | | | |
|---|---|---|---|---|
| 5,945,808 | A * | 8/1999 | Kikuchi et al. | 320/132 |
| 2010/0019729 | A1 * | 1/2010 | Kaita et al. | 320/134 |
| 2011/0121785 | A1 * | 5/2011 | Iida et al. | 320/118 |

* cited by examiner

*Primary Examiner* — Edward Tso
*Assistant Examiner* — Aaron Piggush
(74) *Attorney, Agent, or Firm* — Lionel D. Anderson; Reising Ethington P.C.

(57) ABSTRACT

A system and method for controlling a state-of-charge (SOC) of a vehicle battery, such as a high-voltage battery used by a hybrid electric vehicle (HEV) for vehicle propulsion, so that the SOC is maintained within a desired SOC range that is temperature-dependent. In an exemplary embodiment, the system and method use a battery temperature prediction to determine a desired SOC range, and then control the amount of charge on the vehicle battery such that the SOC is maintained within the desired SOC range. As the battery temperature prediction goes lower (i.e., as it gets colder), the desired SOC range may need to be adjusted or shifted upwards in order to account for increased internal battery resistance and to ensure that the vehicle battery has enough power to start the vehicle. Similarly, as the battery temperature prediction goes higher (i.e., as it gets warmer), the desired SOC range may need to be adjusted or shifted downwards in order to reduce degradation effects and improve battery. The exemplary system and method control the SOC of the vehicle battery and may seek to optimize a number of different parameters, including battery life, battery performance and/or vehicle fuel economy.

19 Claims, 3 Drawing Sheets

METHOD OF CONTROLLING A STATE-OF-CHARGE (SOC) OF A VEHICLE BATTERY

TECHNICAL FIELD

The present invention generally relates to vehicle batteries and, more particularly, to methods and systems that control the state-of-charge (SOC) of vehicle batteries, such as high-voltage batteries used in hybrid electric vehicles (HEVs).

BACKGROUND

The state-of-charge (SOC) of a high-voltage battery, such as the type used in hybrid electric vehicles (HEVs) for vehicle propulsion, typically refers to the amount of charge or energy left in the high-voltage battery and is usually expressed in terms of a percentage. Those skilled in the art will appreciate that it may be desirable for certain types of high-voltage batteries, like those based on lithium-ion chemistries, to be maintained in a certain SOC range. Overcharging and/or undercharging high-voltage batteries such that the SOC goes beyond the boundaries or limits of the corresponding SOC range may result in diminished battery life, battery performance, vehicle fuel economy, or other undesirable consequences.

High-voltage batteries usually need to preserve enough charge or energy so that they can perform certain duties—like starting the vehicle when requested—and the temperature of the battery can affect this. For instance, if it is very cold out (e.g., less than −13° C.), a high-voltage battery based on a lithium-ion chemistry may not have enough power to start a hybrid electric vehicle (HEV). The internal resistance of lithium-ion battery cells usually goes up as the battery temperature goes down, which results in a reduction of available cell current or amperage. High-voltage battery packs, like the ones typically used in HEVs for vehicle propulsion, usually include a number of cells connected in series; thus, the diminished amperage due to extremely cold temperatures may have a compounded affect, as each of the battery cells experiences an amperage reduction. Therefore, it may be necessary to manage the state-of-charge (SOC) in the high-voltage battery to account for this and/or other phenomenon.

SUMMARY

According to one embodiment, there is provided a method of controlling a state-of-charge (SOC) of a vehicle battery. The method may comprise the steps of: (a) generating a battery temperature prediction for the vehicle battery; (b) using the battery temperature prediction to determine a desired SOC range that includes an upper SOC limit, a lower SOC limit, or both, wherein the desired SOC range is at least somewhat temperature dependent; and (c) controlling the amount of charge on the vehicle battery so that the SOC of the vehicle battery is generally maintained within the desired SOC range.

According to another embodiment, there is provided a method of controlling a state-of-charge (SOC) of a vehicle battery. The method may comprise the steps of: (a) determining a battery temperature for the vehicle battery; (b) comparing the battery temperature to a temperature threshold; (c) if the battery temperature is less than the temperature threshold, then adjusting a desired SOC range for the vehicle battery by increasing an upper SOC limit, a lower SOC limit, or both; and (d) controlling the amount of charge on the vehicle battery so that the SOC of the vehicle battery is generally maintained within the desired SOC range.

According to another embodiment, there is provided a battery control system for use in a vehicle. The battery control system may comprise: a high-voltage vehicle battery; a battery control module; at least one temperature sensor that is coupled to the battery control module and provides the battery control module with a battery temperature reading; and a battery charging device, a battery discharging device, or both that is coupled to the battery control module and is capable of influencing a state-of-charge (SOC) of the vehicle battery. The battery control module determines a desired SOC range based at least partially on the battery temperature reading, and the battery control module controls the battery charging device, the battery discharging device, or both such that the vehicle battery is generally maintained within the desired SOC range.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The exemplary system and method described below may be used to control a state-of-charge (SOC) of a vehicle battery, such as the high-voltage batteries used by hybrid electric vehicles (HEVs) for vehicle propulsion, so that the SOC is maintained within a desired SOC range that is temperature-dependent. In an exemplary embodiment, the system and method use a battery temperature prediction to determine a desired SOC range, and then control the amount of charge on the vehicle battery such that the SOC is maintained within the desired SOC range. As the battery temperature prediction goes lower (i.e., as it gets colder), the desired SOC range may need to be adjusted or shifted upwards in order to account for increased internal battery resistance and to ensure that the vehicle battery has enough charge to start the vehicle. The exemplary system and method control the SOC of the vehicle battery and may seek to optimize a number of different parameters, including battery life, battery performance and/or vehicle fuel economy.

Figure 1:
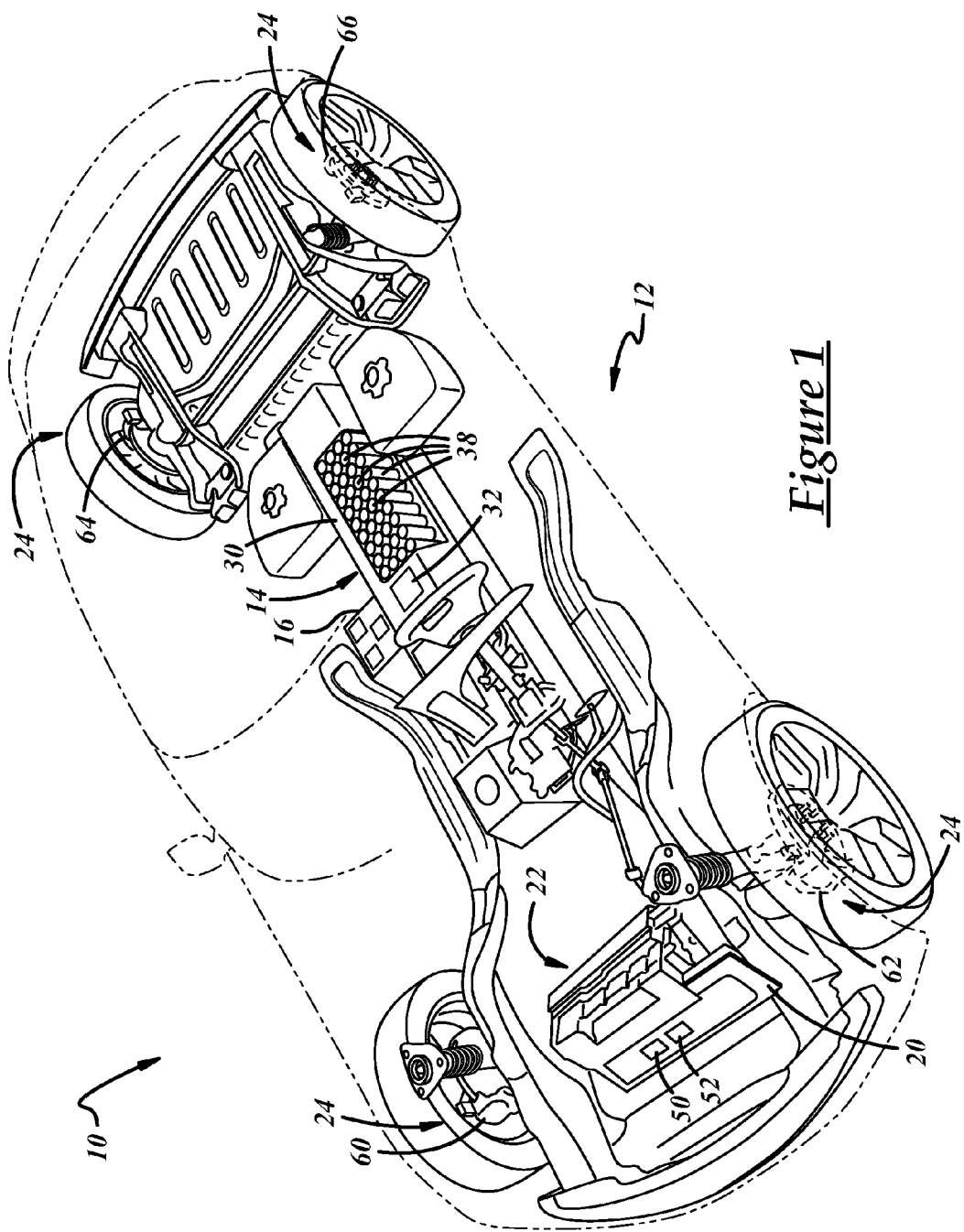
FIG. 1 is a schematic view of an exemplary vehicle having a battery control system that may be used to control the state-of-charge (SOC) of a vehicle battery, such as a high-voltage battery used in hybrid electric vehicles (HEVs) for vehicle propulsion.

With reference to FIG. 1, there is shown a general and schematic view of an exemplary vehicle 10 having a battery control system 12 for use with a high-voltage battery. It should be appreciated that the present system and method may be used with any number of different types of vehicles, including hybrid electric vehicles (HEVs), plug-in hybrid electric vehicles (PHEVs), extended-range electric vehicles (EREVs), and battery electrical vehicles (BEVs), to name but a few. These are merely some of the possible applications, as the system and method described herein are not limited to the embodiment shown in FIG. 1 and could be used in any number of different vehicles. According to one embodiment, battery control system 12 includes a vehicle battery 14, sensor unit 16, a battery control module 20, an engine 22, and a brake system 24.

Vehicle battery 14 provides the vehicle with electrical power and, depending on the particular embodiment, may be the primary vehicle power source or may be used in conjunction with another power source. Vehicle battery 14 may include a high-voltage battery pack 30 as well as a variety of battery sensors 32. Battery pack 30 includes a collection of individual battery cells 38 that are connected in series, parallel, or a combination of both in order to deliver a desired voltage, amperage, capacity, power density, and/or other performance characteristics. Generally, it is desirable for battery pack 30 to provide high power and energy densities, which has led to the development and use of many types of batteries including chemical, non chemical, and others. Some examples of suitable battery types that may be used by battery pack 30 include: all types of lithium-ion (e.g., lithium iron phosphate, lithium nickel manganese cobalt, lithium iron sulfide, lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others. Battery pack 30 may provide approximately 40-600V, depending on its particular design and application. For example, a heavy truck using a two-mode hybrid system may require a high-voltage battery pack capable of providing about 350V, where a lighter vehicle may only need about 200V. In another embodiment, battery control system 12 may be part of a belt-alternator-starter (BAS) type system and thus only require a battery pack that provides about 40-110V. In any case, battery pack 30 should be designed to withstand repeated charge and discharge cycles. Skilled artisans will appreciate that the system and method described herein are not limited to any one particular type of battery or battery arrangement, as a number of different battery embodiments could be used.

Battery sensors 32 may include any combination of hardware and/or software components capable of monitoring, sensing or otherwise determining battery conditions such as temperature, voltage, current, etc. According to one exemplary embodiment, battery sensors 32 include a battery temperature sensor, a battery voltage sensor and/or a battery current sensor. Battery sensors 32 may be integrated within battery pack 30 (e.g., an intelligent or smart battery), they may be external sensors located outside of the battery pack (as schematically shown in FIG. 1), or they may be provided according to some other arrangement. Battery sensors 32 may monitor, sense or otherwise determine battery conditions for one or more individual cells, for a collection or block of cells within battery pack 30 (i.e., a subset of the overall collection of cells), for the entire battery pack, or according to some other method known in the art. According to one embodiment, battery sensors 32 provide battery readings for battery pack 30 on an overall or pack basis (e.g., an overall battery temperature, battery voltage, and battery current reading for the entire battery pack). This is, of course, only one possibility, as the battery readings may be provided according to other techniques as well. Battery sensors 32 may employ any type of suitable technique or method for measurement, estimation, evaluation, etc.; this includes both directly and indirectly determining battery conditions. Output from battery sensors 32 may be provided to battery control module 20 or some other appropriate device in the form of battery readings via a suitable vehicle communications connection (e.g, a CAN bus, a SPI connection, etc.).

Sensor unit 16 may include any combination of hardware and/or software components that are capable of monitoring, sensing or otherwise determining environmental conditions, including environmental conditions inside and outside of the vehicle. According to one exemplary embodiment, sensor unit 16 includes an outside temperature sensor for measuring exterior or ambient temperatures, an inside temperature sensor for measuring cabin or other compartment temperatures, and/or component temperature sensors that monitor the temperature of different vehicle components. Other sensors like those measuring humidity, precipitation, etc. may be used as well. It is possible for battery sensors 32 to be incorporated into sensor unit 16, or vice-versa.

Sensor unit 16 may be integrated within some vehicle component, device, module, system, etc. (e.g., within a control module, within an energy management system, etc.), it may be a stand-alone unit (as schematically shown in FIG. 1), or it may be provided according to some other arrangement. Furthermore, sensor unit 16 may employ any suitable technique or method for measuring, estimating, evaluating, filtering, etc.; this includes both directly and indirectly determining environmental conditions. Output from sensor unit 16 may be provided to battery control module 20 or to some other device in the form of readings via a suitable communications connection (e.g, a CAN bus, a SPI connection, etc.). The method described herein may use battery conditions from battery sensors 32 and/or environmental conditions from sensor unit 16 when controlling the state-of-charge (SOC) of vehicle battery 14, as will be explained. No particular type of sensor, specific technique for gathering or processing the environmental conditions, or particular method for providing the environmental conditions is required for the present method. For instance, it is possible for sensor unit 16 to receive environmental conditions like weather or temperature forecasts from a weather-related service or website that monitors environmental conditions and wirelessly sends those conditions to the vehicle via a telematics device in the sensor unit. Other examples of sensor unit components are possible as well.

Battery control module 20 may include any variety of electronic processing devices, memory devices, input/output (I/O) devices, and/or other known components, and may perform various control and/or communication related functions. In an exemplary embodiment, battery control module 20 includes an electronic memory device 50 that stores various sensor readings (e.g., temperature readings from sensors 32, 16, etc.), look up tables or other data structures, algorithms, etc. Memory device 50 may also store pertinent battery characteristics and background information pertaining to the battery's cell chemistry, cell capacity, upper and lower battery state-of-charge (SOC) limits, battery voltage limits, battery current limits, battery temperature limits, temperature profiles, battery impedance, number or history of charge/discharge cycles, etc. In the exemplary embodiment shown in FIG. 1, battery control module 20 also includes a processor device 52 (e.g., a microprocessor, a microcontroller, an application specific integrated circuit (ASIC), etc.) that executes instructions for software, firmware, programs, algorithms, scripts, etc. that are stored in memory device 50 and may govern the processes and methods described herein. Battery control module 20 may be electronically connected to other vehicle devices and modules via a suitable vehicle communications connection and can interact with them when required. These are, of course, only some of the possible arrangements, functions and capabilities of battery control module 20, as other embodiments could also be used.

Depending on the particular embodiment, battery control module 20 may be a stand-alone vehicle electronic module (e.g., a vehicle control integrated module (VCIM), a traction power inverter module (TPIM), a battery power inverter module (BPIM), etc.), it may be incorporated or included within another vehicle electronic module (e.g., a power train control module or a hybrid control module), or it may be part of a larger network or system (e.g., a battery management system (BMS), a vehicle energy management system, etc.), to name a few possibilities. Battery control module 20 may also be part of or interact with a system that determines a desired hybrid operating mode (e.g., accelerating, braking, idling, stopping, etc.) and may implement electrical power management actions accordingly. Many different battery types and arrangements may be used with the method described below; for instance, the vehicle battery 14, sensor unit 16, and control module 20 may all be integrated and included within one package or they could be separate. The method discussed below is not limited to the exemplary battery control system shown in FIG. 1, as that system is simply provided for purposes of illustrating one potential application for the method.

Engine 22 may propel the vehicle using conventional internal combustion techniques and/or drive a generator, and may include any suitable type of engine known in the art. Some examples of suitable engines include gasoline, diesel, ethanol, flex-fuel, natural gas, liquefied petroleum gas (LPG), hydrogen, naturally aspirated, turbo-charged, super-charged, rotary, Otto-cycle, Atkins-cycle and Miller-cycle engines, as well as others. According to one embodiment, engine 22 is a small fuel-efficient engine (e.g., a small displacement, turbo-charged four-cylinder engine) that receives fuel from a fuel tank and uses the mechanical output of the engine to turn a generator that is coupled to high-voltage vehicle battery 14. Skilled artisans will appreciate that engine 22 may be provided according to any number of different embodiments, may be connected in any number of different configurations (e.g., the engine could be part of a parallel hybrid system where the engine is mechanically coupled to the vehicle wheels, or a part of a serial hybrid system where the engine is mechanically coupled to an electric generator that supplies vehicle battery 14 with charge), and may include any number of different components and devices. Because the present method is not tied to any particular type of engine and because of the widespread knowledge in the art concerning such engines, a further explanation of exemplary engine 22 is omitted. It is also possible for the vehicle to have a fuel cell stack or some other source of electrical energy generation that is used in lieu of or in addition to an internal combustion engine and/or a battery pack for purposes of vehicle propulsion.

Brake system 24 includes brake units 60-66 that are each located at a vehicle wheel or corner and can generate a braking torque to counteract the forward momentum of the vehicle. According to one embodiment, each of the brake units 60-66 may include a rotor, caliper, brake pads, brake piston, and may be part of an electro-hydraulic braking (EHB) system, an electro-mechanical braking (EMB) system, or some other type of frictional or non-frictional system. The method and system described herein are not limited to use with disk brake systems and could be used with other braking systems and arrangements, including drum brake systems. In another embodiment, regenerative braking torque is created by one or more motor units and counteracts the forward momentum of the vehicle through electromagnetically-derived forces that act against the forward rotation of the vehicle wheels and/or other drivetrain components (this process may also charge vehicle battery 14). In another embodiment, the vehicle uses a combination of frictional and regenerative braking to control the speed of the vehicle and to generate electrical energy, and may do so in a controlled manner.

Again, the preceding description of vehicle 10 and battery control system 12 only represents one potential embodiment, and the following method is not confined to being used with only that system.

Figure 2:
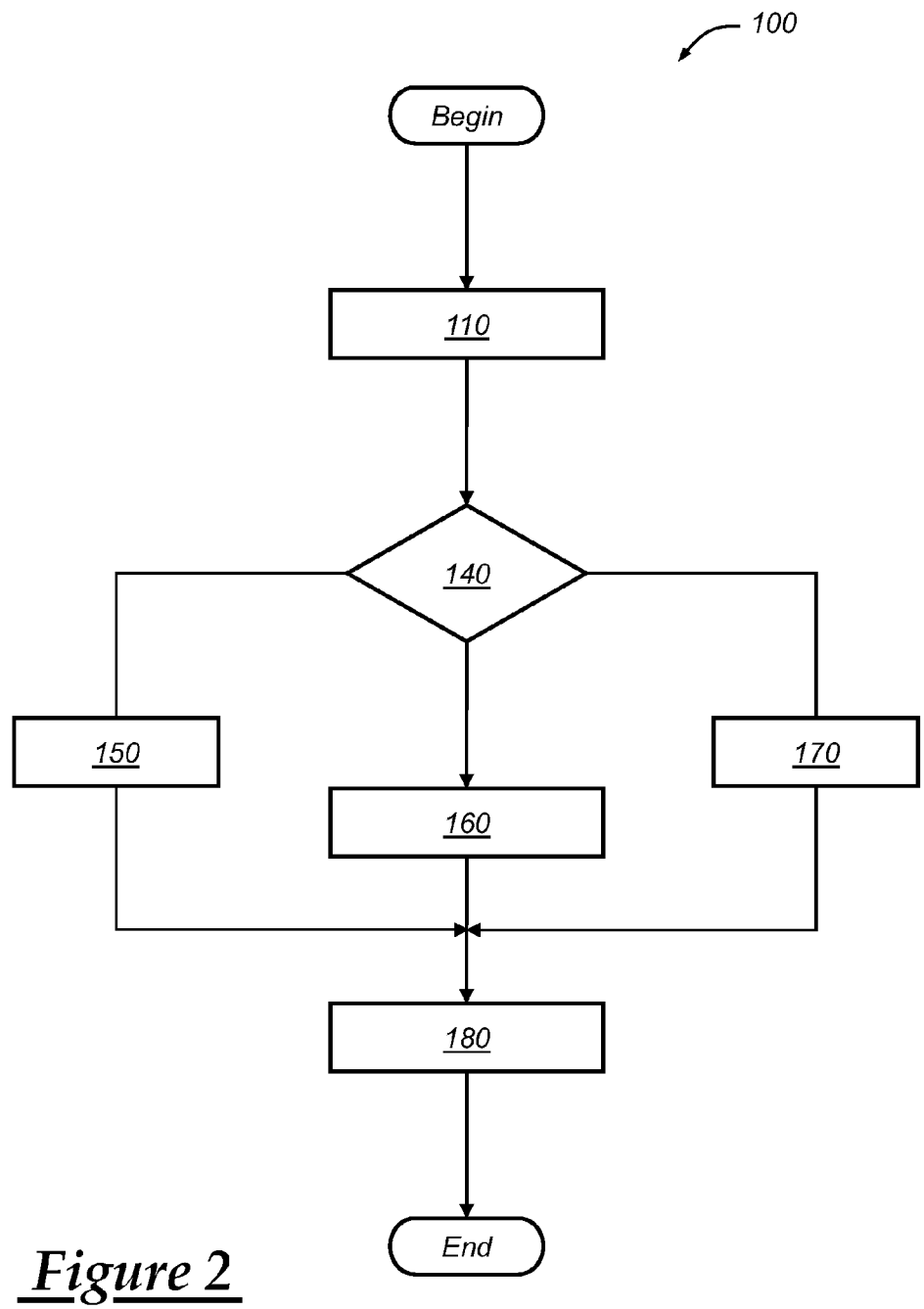
FIG. 2 is a flowchart illustrating an exemplary method for controlling a state-of-charge (SOC) of a vehicle battery, and may be used with the exemplary system shown in FIG. 1.

Turning now to FIG. 2, there is shown an exemplary embodiment of a method 100 for controlling the state-of-charge (SOC) of a vehicle battery, such as vehicle battery 14 discussed above. In this exemplary embodiment, the method generates a battery temperature prediction, and then uses the battery temperature prediction to determine a desired SOC range for the vehicle battery. Once a desired SOC range is established, the method may control the charge or energy in the vehicle battery so that the SOC stays within the desired SOC range. This may be accomplished through a variety of operations or actions that affect charge flow into or out of the vehicle battery. The following explanation of exemplary method 100 is provided in conjunction with the flowchart shown in FIG. 2 and the graph shown in FIG. 3.

Beginning with step 110, the method generates a battery temperature prediction for the vehicle battery. This prediction or estimation may be performed in one of a number of different ways and may involve the use of a variety of different data, including environmental data and/or historical data that pertains to the vehicle and its surroundings. For instance, it is possible for step 110 to gather one or more temperature readings and then select the lowest or coldest of the temperatures to act as the battery temperature prediction. To illustrate, consider the example where battery control module 20 receives an actual outside temperature from sensor unit 16 and an actual battery temperature from battery sensors 32 (e.g., the coldest of the different battery cells 38), and then sets the battery temperature prediction as the lower or colder of these two readings. One reason for using the lower or colder of the two temperatures is because the vehicle battery may have a thermal mass that causes a certain temperature lag, thus, the colder temperature reading provides an indication as to which way the battery temperature is trending. Skilled artisans will appreciate that these temperature readings may be filtered, averaged or otherwise processed over time, and they may be gathered following a 'key-on' event, on a periodic basis (e.g., every couple of seconds, minutes, hours, etc.), or when requested by battery control module 20 or some other component, to cite a few examples.

Other techniques may also be used for generating or determining the battery temperature prediction. For example, it is possible for step 110 to store historical data, like outside air temperatures or battery temperatures, and then apply some type of filter to this historical data to predict or estimate a future battery temperature (e.g., the battery temperature over the next couple of minutes, hours, days, etc). In another embodiment, a telematics unit or some other wireless communications device in sensor unit 16 receives a forecasted outside temperature from a weather-related service, and uses this information to generate the battery temperature prediction. This may require obtaining current global positioning service (GPS) coordinates for the vehicle in order to make sure that the forecasted temperature is for the correct geographical area. It is also possible that some other component, device, module, system, etc. in the vehicle is already in possession of the desired temperature data, and that step 110 simply acquires this data from such a source. Again, any number of techniques may be employed to generate or otherwise determine the battery temperature prediction, including ones based on environmental data, historical data, weather forecasts, trending, seasonal analysis, etc. Although helpful, it is not necessary that step 110 generate a "prediction" or "estimate," per se, as that step could simply use one or more actual temperature or other readings to control the state-of-charge (SOC) of the vehicle battery.

Next, the method uses the battery temperature prediction to determine a desired state-of-charge (SOC) range that includes an upper SOC limit, a lower SOC limit or both. This may be accomplished in any number of different ways. For instance, step 140 may compare the battery temperature prediction to one or more temperature thresholds. The actual value of the temperature thresholds can depend on the chemistry, composition and/or other factors or requirements of the vehicle battery 14 or the vehicle itself (e.g., amount of cold cranking amperage needed to start the vehicle), and the thresholds can be based on empirical or other data. In one embodiment, battery control module 20 compares the predicted battery temperature to a first temperature threshold (e.g., −20° C.) and determines if the predicted battery temperature is less than (i.e., colder) or is greater than (i.e., warmer) the first temperature threshold. Generally speaking, if step 140 determines that the battery temperature prediction is less than the first temperature threshold (i.e., it is colder than the threshold), then this indicates a very cold environment and the desired SOC range will need to be adjusted to ensure that vehicle battery 14 will have enough charge to start the vehicle the next time. If the battery temperature prediction is not less than the first temperature threshold (i.e., it is warmer than the threshold), then the desired SOC range may not need to be adjusted and an old or previous SOC range can be used instead.

Figure 3:
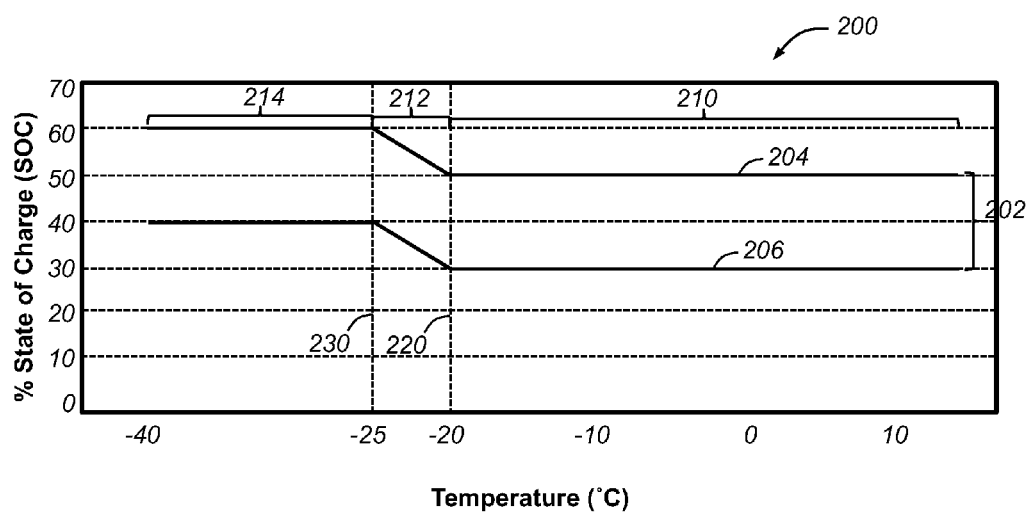
FIG. 3 is a plot illustrating an exemplary relationship between state-of-charge (SOC) and temperature for a vehicle battery, and may be used in conjunction with the exemplary method shown in FIG. 2.

With reference to FIG. 3, there is shown an exemplary plot 200 that illustrates a relationship between state-of-charge (SOC) (y-axis) and temperature (x-axis) for vehicle battery 14, and may be used by the method. The desired state-of-charge (SOC) range 202 includes an upper SOC limit 204 and/or a lower SOC limit 206, and is at least somewhat temperature dependent. Put differently, method 100 seeks to establish a desired SOC range 202 that is optimized for a particular battery temperature prediction. Those skilled in the art will appreciate that the higher the SOC on vehicle battery 14, the higher the charging resistance of the battery but the lower the discharging resistance; and that the lower the SOC on vehicle battery 14, the lower the charging resistance of the battery but the higher the discharging resistance. This SOC versus resistance relationship can be even more pronounced or extreme at extremely cold temperatures, and can affect the overall fuel economy of the vehicle, and are taken into account by plot 200. Another factor to keep in mind is that if the vehicle battery is extremely cold, then there may not be enough charge or amperage to start or crank the vehicle. Thus, desired SOC range 202 is divided into several different SOC regions 210, 212 and 214 based on battery temperature, where the different SOC regions seek to provide an optimized SOC in terms of the factors mentioned above.

If step 140 determines that the battery temperature prediction is greater than a first temperature threshold 220 (e.g., −20° C.), then the predicted temperature falls within first SOC region 210 which is fairly warm, step 150. Because this represents the warmest of the different SOC regions, the danger of not having enough charge on vehicle battery 14 to start the vehicle is fairly low. Thus, the method determines that it is best to try and maximize the fuel economy of the vehicle by using a desired SOC range that has an upper SOC limit 204 of 50% and a lower SOC limit 206 of 30%.

If, however, step 140 determines that the battery temperature prediction is between first and second temperature thresholds 220, 230, then the predicted temperature falls within second SOC region 212, step 160. This is a transition region, where the desired SOC generated by the method varies with temperature and is represented by the angled or sloping upper and lower SOC limits 204, 206. In the second SOC region 212, the predicted battery temperature is cold enough that the method is concerned about not having enough charge or amperage to start the vehicle; thus, the desired SOC range 202 is adjusted or shifted upwards. The angle or slope of the upper and/or lower SOC limits 204, 206 in this transition region may be designed to address the vehicle start or cranking issue mentioned above, yet maintain enough margin to ensure that the desired SOC range maximizes or optimizes fuel efficiency. The method may take charge sacrificing discharge into account when determining the desired SOC range 202. In the exemplary plot 200 shown in FIG. 3, second SOC region 212 has an upper SOC limit 204 that increases or shifts from 50-60%, and a lower SOC limit 206 that increases of shifts from 30-40%.

If step 140 determines that the battery temperature prediction is less than the second temperature threshold 230, thus indicating the coldest scenario, then the predicted temperature falls within third SOC region 214, step 170. Like the first SOC region, the third SOC region has upper and lower SOC limits 204, 206 that are constant. That is, the third SOC region 214 is not a transition region like second SOC region 212. According to this particular example, third SOC region 214 has an upper SOC limit 204 that is 60% and a lower SOC limit that is 40%. In another embodiment of step 170 where the battery temperature prediction falls within the third SOC region 214, the SOC lower limit 206 may simply be set to a constant value or set point (like the last embodiment), but the upper SOC limit 204 may be determined according to a temperature dependent look-up table. In such a case, the upper and lower SOC limits would likely diverge from one another, as opposed to being parallel like those shown in FIG. 3.

Exemplary plot 200 is only provided for purposes of illustration and is not meant to limit the scope or application of exemplary method 100. It should be appreciated that the various upper and lower SOC limits, temperature thresholds, number of SOC regions, etc. can vary from that shown in FIG. 3. For example, in addition to varying the actual quantitative values provided above, it is possible for the upper and/or lower SOC limits 204, 206 to include curves, multiple linear sections, combinations of curves and linear sections, etc. Furthermore, it is not necessary that upper and lower SOC limits 204, 206 be perfectly parallel, as one SOC limit may diverge from the other or follow some other pattern. In some instances, it may be preferable to provide a desired SOC range with only a lower SOC limit 206, as opposed to providing both upper and lower SOC limits. Steps 150, 160 and/or 170 may use stored look-up tables or other data structures to correlate SOC to battery temperature, or they may calculate or derive the data using algorithms and the like.

Steps 150, 160 and/or 170 may include one or more additional steps to ensure that the battery temperature prediction is accurate. Such steps are optional. For example, if method 100 is performed following a key-on event, then steps 150, 160 and/or 170 may inquire as to how long the vehicle was 'off' before trusting the integrity of the battery temperature prediction. If the vehicle was only 'off' for say 30 minutes, the temperature prediction may be skewed due to the residual heat of the vehicle. In such a case, step 150, 160 and/or 170 could refrain from using the plot shown in FIG. 3, and instead simply use the desired SOC range that was used during the last ignition cycle. The amount of time that the vehicle must be 'off' for before the method will use the desired SOC range illustrated in plot 200 can be any duration (e.g., 10 hours), and it can be calibratable. This technique could also be used in conjunction with some type of filtering method, such as those that use slow filters, in order to distinguish data that is attributable to momentary changes or changes while the vehicle is being driven.

Step 180 controls the amount of charge on the vehicle battery so that the SOC is generally maintained within the desired SOC range that was just determined. Skilled artisans will know of a variety of different ways to control charge on vehicle battery 14, any combination of which may be employed here. For instance, battery control module 20 may send command signals to engine 22 that cause it to drive a generator and charge vehicle battery 14 and/or propel the vehicle if the current SOC is at or near the lower SOC limit 206. Battery control module 20 may also send command signals to brake system 26 that cause it to engage in regenerative braking if the present SOC is at or near the lower SOC limit 206, or to use charge-neutral frictional braking if the SOC is at or near the upper SOC limit 204. Of course, other techniques may also be used to maintain the charge or energy in vehicle battery 14 within the desired SOC range 202, as method 100 is not limited to any particular ones.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. Also, additional temperature thresholds, such as those used to determine high temperature environments, may also be used so that the SOC window could be lowered at high temperatures. Such a feature could help protect against situations where the battery is exposed to high temperatures while it exhibits a high SOC, as such a situation can be undesirable for battery life. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of controlling a state-of-charge (SOC) of a vehicle battery, comprising the steps of:
    (a) generating a battery temperature prediction for the vehicle battery;
    (b) using the battery temperature prediction to determine a desired SOC range for the vehicle battery that includes an upper SOC limit, a lower SOC limit, or both, when the battery temperature prediction is warmer than a temperature threshold the desired SOC range is determined for optimum fuel efficiency, and when the battery temperature prediction is colder than a temperature threshold the desired SOC range is adjusted to ensure that the vehicle battery has enough charge to start the vehicle in a cold environment, wherein the desired SOC range is at least partially temperature dependent; and
    (c) controlling the amount of charge on the vehicle battery while the vehicle is being driven so that the SOC of the vehicle battery is substantially maintained within the desired SOC range.

2. The method of claim 1, wherein step (a) further comprises generating the battery temperature prediction by using at least one piece of historical data selected from the group consisting of: past outside temperatures or past battery temperatures.

3. The method of claim 1, wherein step (a) further comprises generating the battery temperature prediction by receiving a forecasted outside temperature from a telematics that receives it from a weather-related service.

4. The method of claim 1, wherein step (b) further comprises using the battery temperature prediction to select between a plurality of SOC regions, wherein at least one of the SOC regions includes an upper SOC limit or a lower SOC limit that varies according to temperature.

5. A method of controlling a state-of-charge (SOC) of a vehicle battery, comprising the steps of:
    (a) generating a battery temperature prediction for the vehicle battery by receiving an actual outside temperature from a first sensor and an actual battery temperature from a second sensor, and setting the battery temperature prediction to the lower of the actual outside temperature and the actual battery temperature;
    (b) using the battery temperature prediction to determine a desired SOC range for the vehicle battery that includes an upper SOC limit, a lower SOC limit, or both, wherein the desired SOC range is at least partially temperature dependent; and
    (c) controlling the amount of charge on the vehicle battery so that the SOC of the vehicle battery is substantially maintained within the desired SOC range.

6. A method of controlling a state-of-charge (SOC) of a vehicle battery, comprising the steps of:
    (a) generating a battery temperature prediction for the vehicle battery;
    (b) comparing the battery temperature prediction to a first temperature threshold, if the battery temperature prediction is greater than the first temperature threshold then using a first SOC region to determine the desired SOC range where the first SOC region has at least one of an upper SOC limit or a lower SOC limit that is substantially constant over a temperature range, and if the battery temperature prediction is less than the first temperature threshold then using a second SOC region to determine the desired SOC range where the second SOC region has at least one of an upper SOC limit or a lower SOC limit that varies over a temperature range, wherein the desired SOC range is at least partially temperature dependent; and
    (c) controlling the amount of charge on the vehicle battery while the vehicle is being driven so that the SOC of the vehicle battery is substantially maintained within the desired SOC range.

7. The method of claim 6, wherein the first SOC region has an upper SOC limit and a lower SOC limit that are substantially constant over a temperature range, and the first SOC region has upper and lower SOC limits that are lower than those of the second SOC region.

8. The method of claim 6, wherein the second SOC region is a transition region and has an upper SOC limit and a lower SOC limit that vary over a temperature range, and the second SOC region has upper and lower SOC limits that are higher than those of the first SOC region.

9. The method of claim 6, wherein the first temperature threshold is between −15° C. and −25° C., inclusive.

10. The method of claim 6, wherein step (b) further comprises comparing the battery temperature prediction to a second temperature threshold, if the battery temperature prediction is greater than the second temperature threshold then using the second SOC region to determine the desired SOC range, and if the battery temperature prediction is less than the second temperature threshold then using a third SOC region to determine the desired SOC range.

11. The method of claim 10, wherein the third SOC region has an upper SOC limit and a lower SOC limit that are substantially constant over a temperature range, and the third SOC region has upper and lower SOC limits that are higher than those of the first and second SOC regions.

12. The method of claim 10, wherein the third SOC region has an upper SOC limit that varies over a temperature range, and a lower SOC limit that is substantially constant over a temperature range.

13. The method of claim 10, wherein the second temperature threshold is between −20° C. and −30° C., inclusive.

14. A method of controlling a state-of-charge (SOC) of a vehicle battery, comprising the steps of:
 (a) determining a battery temperature for the vehicle battery;
 (b) comparing the battery temperature to a temperature threshold, wherein the temperature threshold is at least partially based on a minimum amount of cold cranking amps needed to start the vehicle in a cold environment;
 (c) if the battery temperature is less than the temperature threshold, then adjusting a desired SOC range for the vehicle battery by increasing an upper SOC limit, a lower SOC limit, or both; and
 (d) controlling the amount of charge on the vehicle battery while the vehicle is being driven so that the SOC of the vehicle battery is substantially maintained within the desired SOC range having the increased upper SOC limit, the increased lower SOC limit, or both and maintaining enough charge on the vehicle battery to provide sufficient cold cranking amps to start the vehicle at temperatures below the temperature threshold the next time the vehicle is started.

15. The method of claim 14, wherein step (a) further comprises determining a battery temperature for the vehicle battery by generating a battery temperature prediction.

16. The method of claim 14, wherein the desired SOC range is in a transition region and has an upper SOC limit and a lower SOC limit that vary over a temperature range.

17. The method of claim 14, further comprising the step of:
 comparing the battery temperature to a second temperature threshold, if the battery temperature is greater than the second temperature threshold then using a second SOC region to determine the desired SOC range, and if the battery temperature is less than the second temperature threshold then using a third SOC region to determine the desired SOC range.

18. The method of claim 14, wherein step (c) further comprises using the battery temperature to select between a plurality of SOC regions, wherein at least one of the SOC regions includes an upper SOC limit or a lower SOC limit that varies according to temperature.

19. A battery control system for use in a vehicle, comprising:
 a high-voltage vehicle battery;
 a battery control module;
 at least one temperature sensor being coupled to the battery control module and providing the battery control module with a battery temperature reading; and
 a battery charging device, a battery discharging device, or both being coupled to the battery control module and being capable of influencing a state-of-charge (SOC) of the vehicle battery;
 wherein the battery control module determines a desired SOC range based at least partially on the battery temperature reading, when the battery temperature reading suggests a temperature warmer than a temperature threshold the desired SOC range is determined for optimum fuel efficiency, and when the battery temperature reading suggests a temperature colder than a temperature threshold the desired SOC range is adjusted to ensure that the vehicle battery has enough charge to start the vehicle in a cold environment, and the battery control module controls the battery charging device, the battery discharging device, or both such that the vehicle battery is substantially maintained within the desired SOC range while the vehicle is being driven.

* * * * *